(12) United States Patent
Zhou

(10) Patent No.: US 11,868,010 B2
(45) Date of Patent: Jan. 9, 2024

(54) DISPLAY PANEL AND METHOD FOR PREPARING SAME AND DISPLAY DEVICE

(71) Applicant: TCL CHINA STAR OPTOELECTRONICS TECHNOLOGY CO., LTD., Shenzhen (CN)

(72) Inventor: Shixin Zhou, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 234 days.

(21) Appl. No.: 17/598,293

(22) PCT Filed: Jul. 27, 2021

(86) PCT No.: PCT/CN2021/108754
§ 371 (c)(1),
(2) Date: Sep. 26, 2021

(87) PCT Pub. No.: WO2023/000356
PCT Pub. Date: Jan. 26, 2023

(65) Prior Publication Data
US 2023/0205015 A1    Jun. 29, 2023

(30) Foreign Application Priority Data

Jul. 19, 2021  (CN) .......................... 202110812290.X

(51) Int. Cl.
G02F 1/1337    (2006.01)
G02F 1/137     (2006.01)
B41J 3/407     (2006.01)

(52) U.S. Cl.
CPC ........ *G02F 1/1337* (2013.01); *G02F 1/13378* (2013.01); *G02F 1/13787* (2021.01); *G02F 1/133738* (2021.01); *G02F 1/133769* (2021.01); *B41J 3/407* (2013.01)

(58) Field of Classification Search
None
See application file for complete search history.

(56) References Cited

U.S. PATENT DOCUMENTS

2017/0168355 A1* 6/2017 Lee ................... G02F 1/133784

\* cited by examiner

*Primary Examiner* — Dung T Nguyen
(74) *Attorney, Agent, or Firm* — The Roy Gross Law Firm, LLC; Roy Gross

(57) ABSTRACT

The present disclosure provides a display panel and a method for preparing same, and a display device. The preparation method includes steps of: providing a base plate, wherein the base plate includes a display area and a binding area, and a magnetic composite structure is disposed in the base plate; disposing a magnetic probe at a position on a side of the base plate that corresponds to the binding area; and adding droplets to an upper surface of the base plate, and controlling the magnetic probe to be turned on, so as to form an alignment film having a uniform thickness on the upper surface of the base plate.

20 Claims, 4 Drawing Sheets

DISPLAY PANEL AND METHOD FOR PREPARING SAME AND DISPLAY DEVICE

CROSS REFERENCE TO RELATED APPLICATIONS

This application is a National Phase of PCT Patent Application No. PCT/CN2021/108754 having International filing date of Jul. 27, 2021, which claims the benefit of priority of Chinese Application No. 202110812290.X filed on Jul. 19, 2021. The contents of the above applications are all incorporated by reference as if fully set forth herein in their entirety.

FIELD OF INVENTION

The present disclosure relates to the field of display, and in particular, to a display panel and a method for preparing same and a display device.

BACKGROUND OF INVENTION

Polymer stabilized vertical alignment (PS-VA) is a technology for a thin film transistor liquid crystal display (TFT-LCD). During cell formation by using the PS-VA, a polyimide alignment film needs to be coated on a color filter base plate and an array base plate, and the alignment film plays a role in controlling alignment directions of liquid crystal molecules. A high-performance alignment film structure requires desirable printability, and a polyimide liquid is required to be leveled on the base plate and can form a film having a uniform thickness after heated.

An inkjet printing method is a non-contact polyimide liquid printing method. The polyimide liquid in a storage tank reaches a nozzle part under pressure. Under the control of pulse voltages, a row of thin nozzles on the nozzle spurt out small droplets on the order of picoliter (pL). According to the preset droplet coating dot matrix, small droplets are sprayed on the entire base plate, and then undergo pre-curing and main curing, and finally an alignment film is formed. In the entire inkjet printing method, the small droplets rely on the wetting effect between the base plate and are fused together to form a wet film.

In the inkjet printing method, the dripped polyimide liquid is in the form of microdroplets and still has strong fluidity, and therefore the form before curing has a great influence on the alignment film. However, in some cases, due to the compatibility of polyimide components or the polyimide solvent system, poor linearity of edges may lead to various undesirable conditions, such as an uneven flow of polyimide liquid, an uneven film thickness on the edge of the alignment film, an uneven display around the display area, light leakage on the edge, and the like. If a retaining wall is disposed in the relevant area, a risk of polyimide liquid backflow may also occur. With the development of high-end models to ultra-narrow bezels in the future, the width of the border area is further reduced, the design of the border area becomes more complicated, and the proportion of high-end models in the market is increasing. Therefore, there is an urgent need to finely control the coating accuracy of the polyimide liquid.

SUMMARY OF INVENTION

Technical Problem

An objective of the present disclosure is to provide a display panel and a method for preparing same, which can resolve the technical problem of a low precision of polyimide liquid coating in the prior art.

Technical Solution

In order to achieve the above objective, the present disclosure provides a method for preparing a display panel, the method including steps of: providing a base plate, wherein the base plate includes a display area and a binding area, and a magnetic composite structure is disposed in the base plate; disposing a magnetic probe at a position on a side of the base plate that corresponds to the binding area; and adding droplets to an upper surface of the base plate, and controlling the magnetic probe to be turned on, so that the magnetic probe interacts with the magnetic composite structure, thereby forming an alignment film having a uniform thickness on the upper surface of the base plate.

Further, the step of adding the droplets to the upper surface of the base plate, and controlling the magnetic probe to be turned on includes: adding the droplets to the magnetic composite structure by means of inkjet printing; and disposing the magnetic probe under a gap between any two of the droplets, and controlling the magnetic probe to be turned on, wherein the magnetic probe interacts with the magnetic composite structure, a groove is formed on a surface of the magnetic composite structure, the droplets extend into the groove, and after the magnetic probe is controlled to be turned off, the magnetic composite structure is restored to a flat plane, so that the droplets are uniformly distributed.

Further, when the magnetic probe is controlled to be turned on, the magnetic probe interacts with the magnetic composite structure, and when the magnetic composite structure is deformed, an inclination angle between the magnetic composite structure where the droplets are located and a horizontal plane is in a range of 0° to 2°.

Further, after the magnetic probe is controlled to be turned off, the magnetic composite structure is restored to a flat plane, so that the droplets are uniformly distributed.

Further, the step of preparing the magnetic composite structure includes: preparing a driving feedback layer on the upper surface of the base plate; preparing a magnetic response layer on an upper surface of the driving feedback layer; and preparing a lubricating layer on an upper surface of the magnetic response layer.

Further, the step of preparing the magnetic composite structure includes: preparing a polydimethylsiloxane matrix and a crosslinker, and placing the polydimethylsiloxane matrix and the crosslinker in a vacuum chamber for vacuum defoaming treatment.

Further, the step of preparing the driving feedback layer on the upper surface of the base plate includes: mixing the polydimethylsiloxane matrix with the crosslinker at a ratio of 50:1, then coating the mixture on the binding area of the base plate, and curing the mixture, so as to form the driving feedback layer.

Further, the step of preparing the magnetic response layer on the upper surface of the driving feedback layer includes: adding magnetic particles to the polydimethylsiloxane matrix, coating the magnetic particles on the upper surface of the driving feedback layer, and curing the magnetic particles, so as to form the magnetic response layer.

Further, the step of preparing the lubricating layer on the upper surface of the magnetic response layer includes: mixing the polydimethylsiloxane matrix with the crosslinker at a ratio in a range of 15:1-25:1, then uniformly coating the mixture on the upper surface of the magnetic response layer, and curing the mixture, so as to form a porous structure film layer; and coating trichlorosilane on an upper surface of the porous structure film layer, and fluorinating the trichlorosilane to form the lubricating layer.

In order to achieve the above objective, the present disclosure further provides a display panel, prepared using the method for preparing a display panel as described above.

Further, the display panel includes: a base plate, including a display area and a binding area; a magnetic composite structure, disposed in the binding area of the base plate; and an alignment film, uniformly disposed on an upper surface of the base plate.

Further, the magnetic composite structure includes: a driving feedback layer, disposed on the base plate; a magnetic response layer, disposed on a side of the driving feedback layer that is away from the base plate; and a lubricating layer, disposed on a side of the magnetic response layer that is away from the driving feedback layer.

Further, a magnetic probe is disposed below the magnetic composite structure, the magnetic probe is controlled to be turned on, the magnetic probe interacts with the magnetic composite structure, a groove is formed on a surface of the magnetic composite structure, and droplets on the alignment film extend into the groove.

Further, after the magnetic probe is controlled to be turned off, the magnetic composite structure is restored to a flat plane, so that the droplets are uniformly distributed.

Further, the magnetic response layer is a polymer composite structure containing magnetic particles.

Further, the magnetic particles include micron-sized iron particles.

Further, the lubricating layer is a deformable solid lubricating layer.

Further, a porous structure is disposed in the lubricating layer, and the porous structure is super-lyophobic.

Further, the display panel further includes: a liquid crystal layer, disposed on a side of the alignment film that is away from the base plate.

In order to achieve the above objective, the present disclosure further provides a display device, including the display device as described above and a backlight module.

Beneficial Effects

The technical effect of the present disclosure is that a magnetic composite structure is disposed in a border binding area of a display panel. Through the interaction of a magnetic probe and the magnetic composite structure, the magnetic composite structure undergoes recoverable micro-deformation, which causes droplets on an alignment film located on the magnetic composite structure to quickly level and fill the gap. In this way, the distribution uniformity of the alignment film is improved, the coating accuracy of the alignment film is enhanced, and the display uniformity of the display panel is improved.

BRIEF DESCRIPTION OF DRAWINGS

To describe the technical solutions in the embodiments of the present disclosure more clearly, the accompanying drawings required for describing the embodiments are briefly described hereinafter. Apparently, the accompanying drawings in the following descriptions show merely some embodiments of the present disclosure, and a person skilled in the art may obtain other accompanying drawings according to these accompanying drawings without creative efforts.

DESCRIPTION OF REFERENCE NUMERALS

Figure 1:
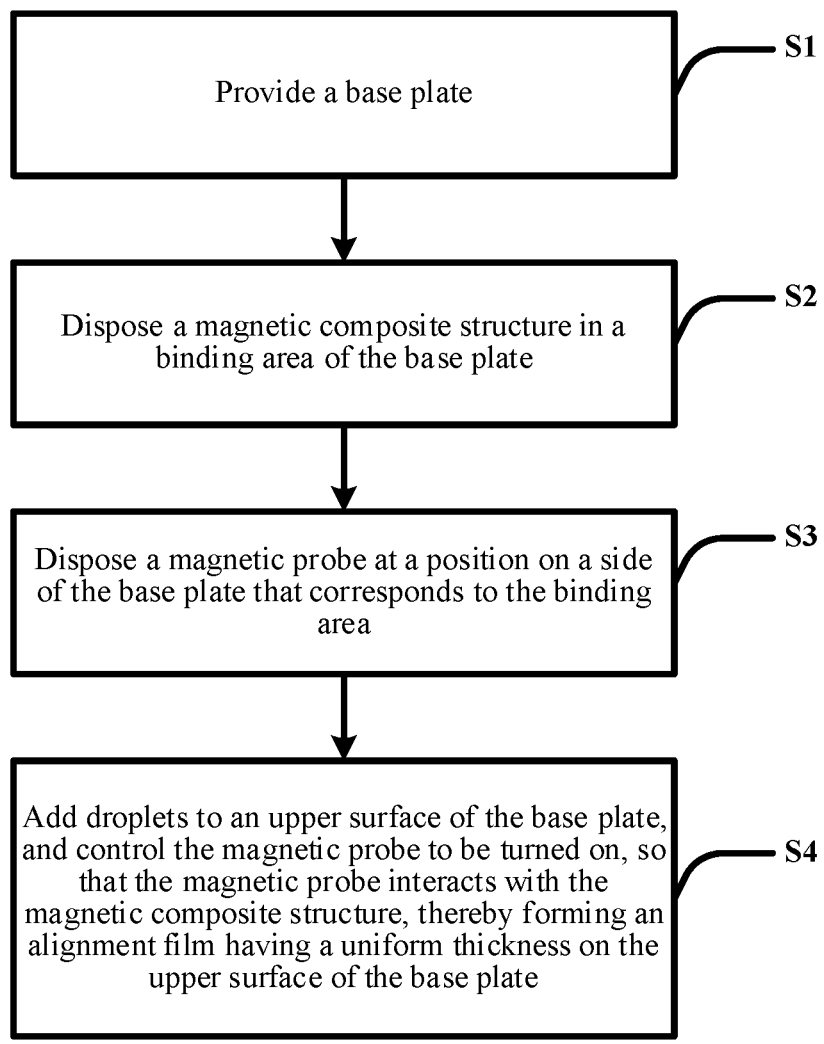
FIG. 1 is a flowchart of a method for preparing a display panel according to an embodiment of the present disclosure.

1. Base plate; 2. Magnetic composite structure; 3. Magnetic probe; 4. Alignment film;
100. Display area; 200. Binding area;
201. Groove;
21. Driving feedback layer; 22. Magnetic response layer; 23. Lubricating layer;
221. Magnetic particle;
41. Droplet.

DETAILED DESCRIPTION OF PREFERRED EMBODIMENTS

The technical solutions of the embodiments of the present disclosure are clearly and completely described in the following with reference to the accompanying drawings of the embodiments of the present disclosure. Apparently, the described embodiments are merely some but not all of the embodiments of the present disclosure. All other embodiments obtained by a person skilled in the art based on the embodiments of the present disclosure without creative efforts shall fall within the protection scope of the present disclosure. In addition, it should be understood that the specific implementations described herein are merely used for describing and illustrating the present disclosure, but are not intended to limit the present disclosure. In the present disclosure, unless otherwise stated, the directional terms such as "up" and "down" generally refer to directions when a device is in actual use or a working state, and specifically refer to drawing directions in the corresponding drawing; and "inside" and "outside" refer to positions relative to the contour of the device.

Embodiments of the present disclosure provide a display panel and a method for preparing same. Detailed descriptions are separately provided below. It should be noted that, the description order of the following embodiments is not intended to limit preference orders of the embodiments.

As shown in FIGS. 1 to 7, the present embodiment provides a method for preparing a display panel. The preparation method includes steps S1-S4.

S1: Provide a base plate 1. The base plate 1 includes a display area 100 and a binding area 200 (see FIG. 2). The display area 100 is configured to implement a display function, and the binding area 200 is disposed at a lower border of the display area 100 for binding and wiring.

S2: Dispose a magnetic composite structure 2 in the binding area 200 of the base plate 1. The formed magnetic composite structure 2 includes a driving feedback layer 21, a magnetic response layer 22, and a lubricating layer 23 that are sequentially prepared (see FIG. 3).

A detailed process for preparing the magnetic composite structure 2 includes: preparing a driving feedback layer 21 on an upper surface of the binding area 200 of the base plate 1; preparing a magnetic response layer 22 on an upper surface of the driving feedback layer 21; and preparing a lubricating layer 23 on an upper surface of the magnetic response layer 22.

The driving feedback layer 21 is prepared using a polydimethylsiloxane elastomer having a low crosslinking density. In detail, the step of preparing the driving feedback layer 21 includes: providing a polydimethylsiloxane matrix and a crosslinker as spare materials. In the present embodiment, a ratio 50:1 of the polydimethylsiloxane matrix to the crosslinker is used as an example. First, the polydimethylsiloxane matrix and the crosslinker are placed in a vacuum chamber for vacuum deformation, so as to enhance the adhesion between the polydimethylsiloxane matrix and the crosslinker. In this way, a mixture of the polydimethylsiloxane matrix and the crosslinker is formed. The mixture is uniformly coated on the binding area 200, and a coating thickness is in a range of 1 micron to 3 microns. At a temperature in a range of 60-65° C., the mixture is cured for 5-6 hours to form the driving feedback layer 21.

The step of preparing the magnetic response layer 22 includes: providing a polydimethylsiloxane matrix and a crosslinker as spare materials. First, the polydimethylsiloxane matrix and the crosslinker are placed in a vacuum chamber for vacuum deformation, so as to enhance the adhesion between the polydimethylsiloxane matrix and the crosslinker. Magnetic particles 221 having a mass fraction of 60-90 wt % are added to the polydimethylsiloxane matrix. In the present embodiment, a ratio of the magnetic particles 221 to the polydimethylsiloxane matrix ranges from 20:1 to 70:1. After the present embodiment, the magnetic particles 221 are preferably micron-sized iron particles. The magnetic particles are coated on the upper surface of the driving feedback layer 21, a coating thickness is in a range of 0.1-3 microns, and the magnetic particles are cured at a temperature in a range of 60-65° C. for 5-6 hours to form the magnetic response layer 22. The magnetic response layer 22 is a polymer composite structure containing magnetic particles 221.

The step of preparing the lubricating layer 23 includes: providing a polydimethylsiloxane matrix and a crosslinker as spare materials. First, the polydimethylsiloxane matrix and the crosslinker are placed in a vacuum chamber for vacuum deformation, so as to enhance the adhesion between the polydimethylsiloxane matrix and the crosslinker. In the present embodiment, a mass ratio of the polydimethylsiloxane matrix and the crosslinker is in a range of 15:1 to 25:1, and the polydimethylsiloxane matrix and the crosslinker serve as a shelter.

The polydimethylsiloxane matrix and the crosslinker are coated on the upper surface of the magnetic response layer 22 after being uniformly mixed, and the coating thickness is in a range of 0.1-3 um. At a temperature in a range of 60-65° C., the mixture is first cured for half an hour. After a silica porous structure is formed, the shelter is cured at a temperature of 65° C. for 4-6 hours again to completely cure the shelter to form a porous structure film layer.

Finally, trichloro (1H, 1H, 2H, 2H-perfluorooctyl) silane is coated on an upper surface of the porous structure film layer using a chemical vapor deposition method and fluorinated to form the lubricating layer 23. The porous structure film layer can exhibit super-lyophobicity. The trichlorosilane is coated to enhance the lubricating effect of the surface of the lubricating layer 23 and prevent the sliding and leveling of the droplets 41 of the subsequent alignment film from being hindered. A micro-nano porous structure is disposed in the lubricating layer 23. After a liquid is poured into the porous structure to form a super-lubricity lyophobic surface. The lubricating layer 23 is a deformable solid lubricating layer.

S3: Dispose a magnetic probe 3 at a position on a side of the base plate 1 that corresponds to the binding area 200.

S4: Add droplets 41 to an upper surface of the base plate 1, and control the magnetic probe 3 to be turned on, so that the magnetic probe 3 interacts with the magnetic composite structure 2, thereby forming an alignment film 4 having a uniform thickness on the upper surface of the base plate 1.

The droplets 41 are added to an upper surface of the lubricating layer 23 of the magnetic composite structure 2 by means of inkjet printing.

Figure 4:
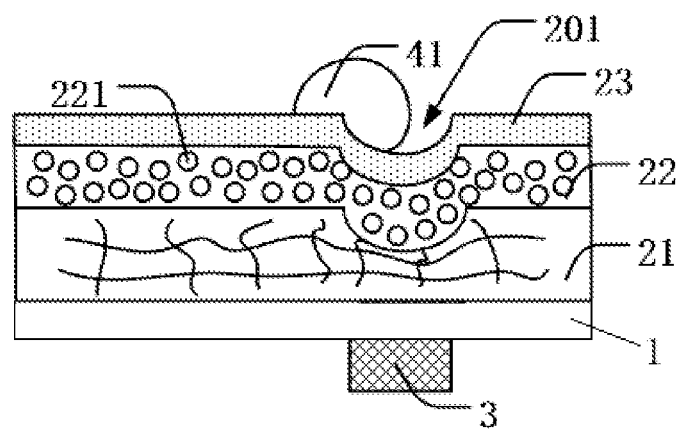
FIG. 4 is a state diagram when a magnetic probe is controlled to be turned on according to an embodiment of the present disclosure.

As shown in FIG. 4, the magnetic probe 3 is disposed under a gap between any two of the droplets 41, and the magnetic probe 3 is controlled to be turned on. The magnetic probe 3 interacts with the magnetic composite structure 2, and the magnetic composite structure 2 may undergo recoverable deformation. A plurality of grooves 201 are formed on a surface of the magnetic composite structure 2. Because the upper surface of the magnetic composite structure 2 is the lubricating layer 23 having super lubricating properties, the droplets 41 may quickly level and extend into the groove 201 to fill an area covered by the droplets 41, thereby improving the film layers uniformity of the alignment film 4 and improving the coating accuracy of the alignment film 4.

Figure 5:
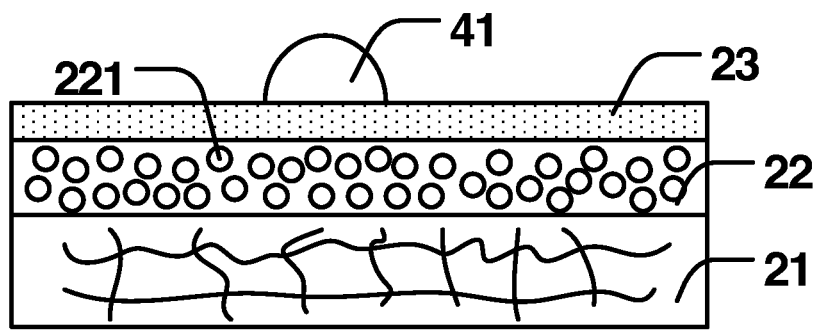
FIG. 5 is a state diagram when a magnetic probe is controlled to be turned off according to an embodiment of the present disclosure.

As shown in FIG. 5, when the droplets 41 are leveled to a certain extent, the magnetic probe 3 may be controlled to be turned off. That is to say, the magnetic field environment is closed. At this point, the magnetic composite structure 2 may be restored to a flat plane to form a uniform and flat alignment film 4 (see FIG. 6). In this way, the display uniformity of the display area can be ensured, the coating accuracy of the alignment film 4 is enhanced, and the display effect is improved.

In general, the droplets 41 level out quickly after dripping, but in the binding area 200 located at the edge of the base plate 1, various undesirable conditions may occur due to poor edge straightness, for example, phenomena, such as uneven flow of the droplets 41, uneven film thicknesses on the edge of the alignment film 4, uneven display on the periphery of the display area 100, light leaks on the edge, and the like.

However, in the present embodiment, the magnetic composite structure 2 and the magnetic probe 3 are disposed in the binding area 200. After the magnetic probe 3 is turned on, a magnetic field is constructed to stimulate the fine movement of the droplets 41. The magnetic composite structure 2 combines the magnetic response layer 22 containing the magnetic particles 221 with the lubricating layer 23 having a super-lubricity lyophobic surface that is formed by infusion of the micro-nano structure liquid. Due to the interaction force between the magnetic probe 3 and the magnetic response layer 22, the driving feedback layer 21 may undergo reversible micro-deformation (see FIG. 4), so that the binding area 200 is slightly deformed under driving of the magnetic field to stimulate and drive the droplets 41 and the area having uneven film thicknesses, thereby achieving fine manipulation and improving the film layer uniformity of the alignment film 4.

Figure 7:
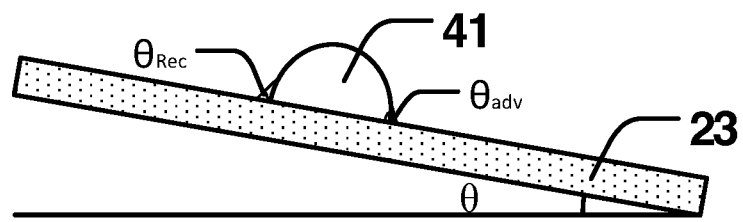
FIG. 7 is a schematic diagram of an inclination angle when the magnetic probe is controlled to be turned on according to an embodiment of the present disclosure.
Figure 8:
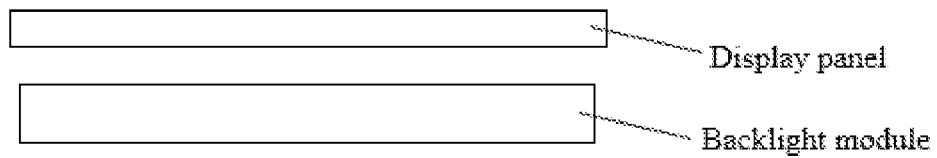
FIG. 8 is a schematic diagram showing the backlight module according to an embodiment of the present disclosure.

As shown in FIG. 7, when the magnetic composite structure 2 undergoes micro-deformation, an inclination angle is formed. The inclination angle may be referred to as a low sliding angle θ. The low sliding angle ranges from 0° to 2°, and angles of $θ_{rec}$ and $θ_{adv}$ are equal or approximately equal. A smaller difference between the angles of $θ_{rec}$ and $θ_{adv}$ facilitates the leveling of the droplets 41.

When the mass fraction of the magnetic particles 221 in the magnetic response layer 22 is constant, the main reason for the deformation of the magnetic composite structure 2 depends on an operating distance of the magnetic probe 3, a field strength, and a modulus of the polydimethylsiloxane matrix.

The operating distance is the thickness of the driving feedback layer 21. Therefore, a length of the operating distance may be controlled by changing the thickness of the driving feedback layer 21, and the modulus may be controlled by means of a degree of crosslinking of the polydimethylsiloxane matrix and the crosslinker. In the present embodiment, the ratio of the polydimethylsiloxane matrix to the crosslinker is in a range of 20:1 to 70:1.

In the present embodiment, the magnetic composite structure 2 is disposed in the binding area 200 to stimulate the droplets 41 of the alignment film 4 to move and level finely after dripping. Therefore, the display uniformity on the edge of the display panel is improved, and the coating accuracy of the alignment film 4 is improved, thereby causing the magnetic composite structure to be more applicable to an ultra-narrow bezel.

The present embodiment further provides a display device. The display device includes a display panel and a backlight module.

Figure 2:
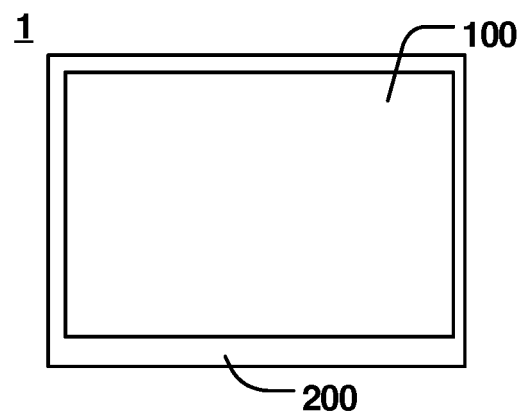
FIG. 2 is a schematic diagram of a display panel according to an embodiment of the present disclosure.
Figure 6:
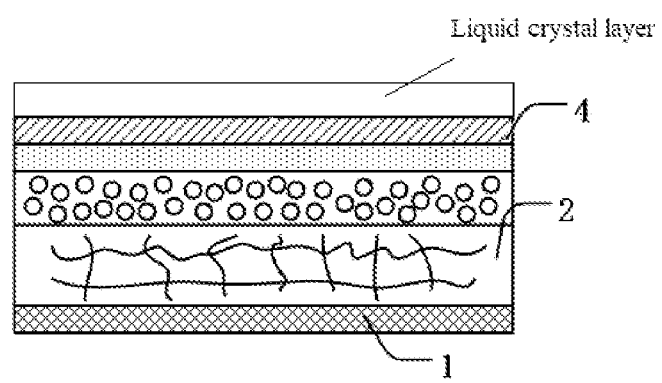
FIG. 6 is a schematic diagram of a structure of a display panel according to an embodiment of the present disclosure.

As shown in FIG. 2 and FIG. 6, the display panel includes a display area 100 and a binding area 200. The display panel has a base plate 1, a magnetic composite structure 2, and an alignment film 4, and further includes structures, such as a liquid crystal layer, other base plates, and the like.

Figure 3:
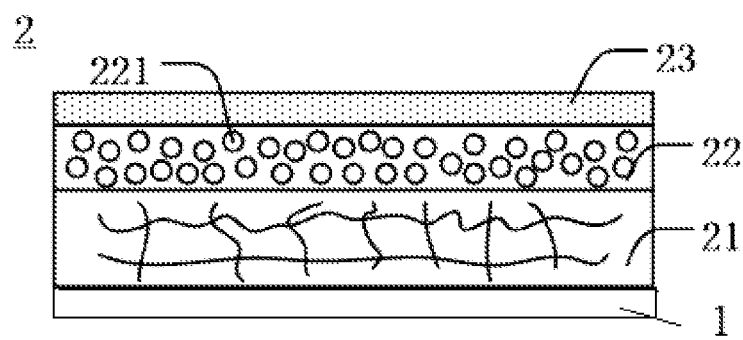
FIG. 3 is a schematic diagram of a magnetic composite structure according to an embodiment of the present disclosure.

The magnetic composite structure 2 includes a driving feedback layer 21, a magnetic response layer 22, and a lubricating layer 23 (see FIG. 3).

The driving feedback layer 21 is prepared using a polydimethylsiloxane elastomer having a low crosslinking density. A thickness of the film layer is in a range of 1 micron to 3 microns.

The magnetic response layer 22 is a polymer composite structure containing magnetic particles 221, the magnetic particles 221 are preferably micron-sized iron particles, and the film thickness of the magnetic response layer 22 is in a range of 0.1 micrometer to 3 micrometers.

A micro-nano porous structure is disposed in the lubricating layer 23. After a liquid is poured into the porous structure to form a super-lubricity lyophobic surface. The lubricating layer 23 is a deformable solid lubricating layer. The film layer thickness of the lubricating layer 23 is in a range of 0.1 micron to 3 microns.

The alignment film 4 is uniformly distributed on the upper surfaces of the base plate 1 and the lubricating layer 23.

As shown in FIG. 4, the magnetic probe 3 is disposed at a position of the alignment film 4 that is non-uniformly coated, and the magnetic probe 3 is controlled to be turned on. The magnetic probe 3 interacts with the magnetic composite structure 2, and the magnetic composite structure 2 may undergo recoverable deformation. A plurality of grooves 201 are formed on an upper surface of the magnetic composite structure 2. Because the upper surface of the magnetic composite structure 2 is the lubricating layer 23 having super lubricating properties, the droplets 41 may quickly level and extend into the groove 201 to fill an area that is not covered by the droplets 41, thereby improving the film layer uniformity of the alignment film 4.

As shown in FIG. 5, when the droplets 41 are leveled to a certain extent, the magnetic probe 3 may be controlled to be turned off. That is to say, the magnetic field environment is closed. At this point, the magnetic composite structure 2 may be restored to a flat plane to form a uniform and flat alignment film 4. In this way, the display uniformity of the display area can be ensured, the coating accuracy of the alignment film 4 is enhanced, and the display effect of the display panel is improved.

As shown in FIG. 7, when the magnetic composite structure 2 undergoes micro-deformation, an inclination angle is formed. The inclination angle may be referred to as a low sliding angle θ. The low sliding angle ranges from 0° to 2°, and angles of $θ_{rec}$ and $θ_{adv}$ are equal or approximately equal. A smaller difference between the angles of $θ_{rec}$ and $θ_{adv}$ facilitates the leveling of the droplets 41.

When the mass fraction of the magnetic particles 221 in the magnetic response layer 22 is constant, the main reason for the deformation of the magnetic composite structure 2 depends on an operating distance of the magnetic probe 3, a field strength, and a modulus of the polydimethylsiloxane matrix.

The operating distance is the thickness of the driving feedback layer 21. Therefore, a length of the operating distance may be controlled by changing the thickness of the driving feedback layer 21, and the modulus may be controlled by means of a degree of crosslinking of the polydimethylsiloxane matrix and the crosslinker. In the present embodiment, the ratio of the polydimethylsiloxane matrix to the crosslinker is in a range of 20:1 to 70:1.

The base plate may be an array base plate or a color filter base plate, and an alignment film 4 is disposed on a surface of a side opposite to the array base plate and the color filter base plate. A liquid crystal layer is disposed between the two alignment films 4, and a uniform and flat alignment film 4 facilitates more uniform deflection of the liquid crystal in the liquid crystal layer, thereby improving the display effect of the display panel.

In the present embodiment, the magnetic composite structure 2 is disposed in the binding area 200 to stimulate the droplets 41 of the alignment film 4 to move and level finely after dripping. Therefore, the display uniformity on the edge of the display panel is improved, and the coating accuracy of the alignment film 4 is improved, thereby causing the magnetic composite structure to be more applicable to a display panel having an ultra-narrow bezel.

A display panel and a method for preparing same, and a display device provided in the embodiments of the present disclosure are described above in detail. Although the principles and implementations of the present disclosure are described by using specific examples in this specification, the descriptions of the above embodiments are merely used for helping understand the method and the core idea of the method of the present disclosure. Meanwhile, a person of ordinary skill in the art may make modifications to the specific implementations and application range according to the ideas of the present disclosure. In conclusion, the content of the specification is not to be construed as a limitation to the present disclosure.

What is claimed is:

1. A method for preparing a display panel, the method comprising steps of:
   providing a base plate, wherein the base plate comprises a display area and a binding area, and a magnetic composite structure is disposed in the base plate;
   disposing a magnetic probe at a position on a side of the base plate that corresponds to the binding area; and
   adding droplets to an upper surface of the base plate, and controlling the magnetic probe to be turned on, so that the magnetic probe interacts with the magnetic composite structure, thereby forming an alignment film having a uniform thickness on the upper surface of the base plate.

2. The method for preparing a display panel as claimed in claim 1, wherein the step of adding the droplets to the upper surface of the base plate, and controlling the magnetic probe to be turned on comprises:
   adding the droplets to the magnetic composite structure by means of inkjet printing; and
   disposing the magnetic probe under a gap between any two of the droplets, and controlling the magnetic probe to be turned on, wherein the magnetic probe interacts with the magnetic composite structure, a groove is formed on a surface of the magnetic composite structure, and the droplets extend into the groove.

3. The method for preparing a display panel as claimed in claim 2, wherein after the magnetic probe is controlled to be turned off, the magnetic composite structure is restored to a flat plane, so that the droplets are uniformly distributed.

4. The method for preparing a display panel as claimed in claim 1, wherein when the magnetic probe is controlled to be turned on, the magnetic probe interacts with the magnetic composite structure, and when the magnetic composite structure is deformed, an inclination angle between the magnetic composite structure where the droplets are located and a horizontal plane is in a range of 0° to 2°.

5. The method for preparing a display panel as claimed in claim 1, wherein the step of preparing the magnetic composite structure comprises:
   preparing a driving feedback layer on the upper surface of the base plate;
   preparing a magnetic response layer on an upper surface of the driving feedback layer; and
   preparing a lubricating layer on an upper surface of the magnetic response layer.

6. The method for preparing a display panel as claimed in claim 5, wherein the step of preparing the magnetic composite structure comprises:
   preparing a polydimethylsiloxane matrix and a crosslinker, and placing the polydimethylsiloxane matrix and the crosslinker in a vacuum chamber for vacuum defoaming treatment.

7. The method for preparing a display panel as claimed in claim 6, wherein the step of preparing the driving feedback layer on the upper surface of the base plate comprises:
   mixing the polydimethylsiloxane matrix with the crosslinker at a ratio of 50:1, then coating the mixture on the binding area of the base plate, and curing the mixture, so as to form the driving feedback layer.

8. The method for preparing a display panel as claimed in claim 6, wherein the step of preparing the magnetic response layer on the upper surface of the driving feedback layer comprises:
   adding magnetic particles to the polydimethylsiloxane matrix, coating the magnetic particles on the upper surface of the driving feedback layer, and curing the magnetic particles, so as to form the magnetic response layer.

9. The method for preparing a display panel as claimed in claim 6, wherein the step of preparing the lubricating layer on the upper surface of the magnetic response layer comprises:
   mixing the polydimethylsiloxane matrix with the crosslinker at a ratio in a range of 15:1-25:1, then uniformly coating the mixture on the upper surface of the magnetic response layer, and curing the mixture, so as to form a porous structure film layer; and
   coating trichlorosilane on an upper surface of the porous structure film layer, and fluorinating the trichlorosilane to form the lubricating layer.

10. A display panel, prepared using the method for preparing a display panel as claimed in claim 1.

11. The display panel as claimed in claim 10, comprising:
    a base plate, comprising a display area and a binding area;
    a magnetic composite structure, disposed in the binding area of the base plate; and
    an alignment film, uniformly disposed on an upper surface of the base plate.

12. The display panel as claimed in claim 11, wherein the magnetic composite structure comprises:
    a driving feedback layer, disposed on the base plate;
    a magnetic response layer, disposed on a side of the driving feedback layer that is away from the base plate; and
    a lubricating layer, disposed on a side of the magnetic response layer that is away from the driving feedback layer.

13. The display panel as claimed in claim 12, wherein the magnetic response layer is a polymer composite structure containing magnetic particles.

14. The display panel as claimed in claim 13, wherein the magnetic particles comprise micron-sized iron particles.

15. The display panel as claimed in claim 12, wherein the lubricating layer is a deformable solid lubricating layer.

16. The display panel as claimed in claim 12, wherein a porous structure is disposed in the lubricating layer, and the porous structure is super-lyophobic.

17. The display panel as claimed in claim 11, wherein a magnetic probe is disposed below the magnetic composite structure, the magnetic probe is controlled to be turned on, the magnetic probe interacts with the magnetic composite structure, a groove is formed on a surface of the magnetic composite structure, and droplets on the alignment film extend into the groove.

18. The display panel as claimed in claim 17, wherein after the magnetic probe is controlled to be turned off, the magnetic composite structure is restored to a flat plane, so that the droplets are uniformly distributed.

19. The display panel as claimed in claim 11, further comprising:
    a liquid crystal layer, disposed on a side of the alignment film that is away from the base plate.

20. A display device, comprising the display panel as claimed in claim 10 and a backlight module.

* * * * *